US005188213A

United States Patent [19]

Koch

[11] Patent Number: 5,188,213

[45] Date of Patent: Feb. 23, 1993

[54] APPARATUS FOR TRANSPORTING CABLE LENGTHS OR SECTIONS

[75] Inventor: Max Koch, Meggen, Switzerland

[73] Assignee: TTC Technology Trading Company, Meggen, Switzerland

[21] Appl. No.: 780,483

[22] Filed: Oct. 22, 1991

[30] Foreign Application Priority Data

Oct. 29, 1990 [CH] Switzerland ......................... 3436/90

[51] Int. Cl.[5] ............................................ B65G 25/00

[52] U.S. Cl. ............................... 198/470.1; 198/803.7

[58] Field of Search .................. 198/470.1, 378, 803.7; 29/742, 759

[56] References Cited

U.S. PATENT DOCUMENTS

| | | | |
|---|---|---|---|
| 2,927,679 | 3/1960 | Rively | 198/803.7 X |
| 3,149,714 | 9/1964 | Williams et al. | 198/378 |
| 3,583,055 | 6/1971 | Hammond | 29/564.1 |
| 3,747,737 | 7/1973 | Brooke | 198/803.7 X |
| 3,961,703 | 6/1976 | McKeever | 198/803.7 X |
| 4,916,811 | 4/1990 | Uehara et al. | 29/863 |

FOREIGN PATENT DOCUMENTS

| | | | |
|---|---|---|---|
| 0272395 | 6/1988 | European Pat. Off. . | |
| 2622360 | 12/1977 | Fed. Rep. of Germany . | |
| 1360435 | 3/1964 | France . | |
| 0668406 | 12/1988 | Switzerland | 198/803.7 |

*Primary Examiner*—Robert P. Olszewski

*Assistant Examiner*—Cheryl L. Gastineau

*Attorney, Agent, or Firm*—Sandler Greenblum & Bernstein

[57] ABSTRACT

The apparatus for transporting cable sections enables transporting the cable sections cyclically or intermittently along a cable section processing line by means of double grippers which grasp opposite ends of an associated cable section. These double grippers are arranged at a substantially uniform spacing from one another at the outer periphery of a transport element. The double grippers are rotationally mounted perpendicular to the direction of movement of the transport element and perpendicular to the lengthwise axis of the grasped opposite ends of the cable sections. At least at two locations of the transport element there are stationarily arranged gripper actuators for opening each closed double gripper which has been closed under the action of the force of an associated spring, once in order to receive an infed cable section, and once to release the finished-processed cable section. The opposite ends of each engaged cable section are moved past cable work stations and during a work cycle, after having previously centered the related double gripper, processed or fitted with a terminal. By incorporating a pivot device or a rotary device each double gripper together with the grasped cable section, can be latchably rotated about its axis of rotation through predetermined angles.

11 Claims, 5 Drawing Sheets

APPARATUS FOR TRANSPORTING CABLE LENGTHS OR SECTIONS

CROSS REFERENCE TO RELATED APPLICATION

This application is related to the commonly assigned, copending U.S. application Ser. No. 07/780,296, filed Oct. 22, 1991, now abandoned and entitled "Cable Feed Apparatus".

BACKGROUND OF THE INVENTION

1. Field of the Invention

The present invention relates to a new and improved apparatus for transporting cable lengths or sections—also referred to in the art as wire or lead lengths or sections—in a direction substantially perpendicular to the lengthwise axis of such cable lengths or sections.

Generally speaking, the apparatus of the present development for transporting cable lengths or sections is of the type comprising at least one intermittently driven endless transport element or device arranged upon a machine frame. Grippers are arranged at the same spacing in tandem or behind one another at the outer periphery of the transport element. These grippers close due to the force of associated springs and grasp both ends of an associated cable section or length at the region of a deflection location of the transport element or device. These cable sections are delivered by a cable feed or infeed device. During the intermittent revolving motion of the transport element the grippers retain the cable sections, move such past work or processing stations, and at the region of the other deflection location of the transport element the grippers transfer the previously grasped cable sections to a cable processing station, such as a cable deposit structure or receiver or to a further cable fitting installation or station.

2. Discussion of the Background and Material Information

Such cable section transport apparatuses serve to cyclically or intermittently transport electrical cables along a cable processing line from one work or processing station to the next. At the work stations the ends of the cable sections are stripped of their electrical insulation and there is fitted a plugable terminal or electrical connector at the end of the electrical cable and which is preferably fabricated from a stamped or punched sheet metal part.

German Published Patent Application No. 2,622,360, published Dec. 8, 1977 discloses such type cable section transport apparatus, wherein gripper clamp carriages which are articulated to one another are assembled to form an endless articulated or hinge chain. Each gripper clamp carriage comprises four travel rollers riding upon support rails and a gripper clamp pivotally mounted upon bearing bolts. The gripper is retained in a closed position by a compression or pressure spring and a cam and in a open position by control rolls and guide cams. Two such endless articulated chain drives containing a forward feed path, a return path and two deflection locations are arranged in parallelism next to one another upon a machine frame so as to be retractable from one another in such a manner that a respective gripper of each articulated chain drive grasps an end of a cable section and the parallel spacing of both articulated chain drives is accommodated to the length of the cable section which is to be momentarily processed.

Furthermore, at one deflection location the articulated chain drives are provided with a respective toothed double drive wheel or gear arranged at both sides adjacent each chain and which in each case engage with the teeth between the travel rollers of the gripper clamp carriages and drive the articulated chains. A cantilever arm secured to the machine frame merges with the drive wheels. This cantilever arm has upper and lower guide tracks tangentially associated with the drive wheels and receive the travel rollers of the gripper clamp carriages. At the other deflection location there are provided tensionable stationary deflection guide tracks which merge with the upper and lower guide tracks. During a revolving movement the gripper clamps open for a short period of time, once in order to receive a cable section and once for the delivery of the finally processed cable section which has been fitted with terminals or connectors. At all other regions the gripper clamps are closed, and between the time that there is received and the time that there is delivered the cable section these gripper clamps firmly hold in place, through the force of a spring, the ends of each associated cable section to be processed.

A drawback of this cable section transport apparatus resides in the fact that, in particular, the drive wheels, the guide tracks for the travel rollers and the guide cams or curves for opening and closing the gripper clamps are relatively complicated and expensive, and the ends of the cable sections are retained in a rigid holder or support without any possibility of movement. A further drawback will be seen in that, such prior art cable section transport apparatus requires a considerable amount of space and yet there can not be transported and processed cable sections of random length. This is so because the minimum and maximum lengths of the cable sections is dependent upon how close together and how far apart there can be brought both of the justapositioned articulated chain drives.

SUMMARY OF THE INVENTION

Therefore, with the foregoing in mind, it is a primary object of the present invention to provide an improved cable section transport apparatus which is not afflicted with the aforementioned shortcomings and drawbacks of the prior art.

Another and more specific object of the present invention aims at the provision of an improved apparatus for the transport of cable sections, which is relatively simple in construction, quiet in operation, requires relatively little space, is extensively independent of the length of the individual cable sections to be processed, and wherein, all of the engaged or grasped ends or end portions of the cable sections can be processed at each work or processing station, and cable section ends which have been fitted with terminals or electrical plug connectors or the like can be moved past a fitting press or device which is not being used without the need for the fitting press or device to be moved out of the way.

Still a further noteworthy object of the present invention is the provision of an improved cable section transport apparatus which is relatively compact in design, highly reliable in operation, quite economical in construction, and requires a minimum of maintenance and servicing.

Now in order to implement these and still further objects of the present invention, which will become more readily apparent as the description proceeds, the cable or cable section transport apparatus of the present development is manifested, among other things, by the features that the each of the grippers arranged upon a single endless transport element comprises a rotatably mounted double or twin gripper.

According to the present invention, each of the double grippers comprises a pair of spaced apart gripper units, and each gripper unit of a double gripper engages one end of oppositely situated ends of a grasped cable section.

A further aspect of the invention, provides spring means for selectively retaining each associated double gripper in a first work position or a second work position rotated through an angle of approximately 180° with respect to the first position where each cable end of a grasped cable section is retained in a plane which extends substantially parallel to a movement plane of the endless transport element in a direction towards the cable work stations.

Still further, the machine frame comprises at least one support wall, and there are provided means enabling pivoting or rotation of each of the double grippers which comprise for each double gripper a control cam possessing guide groove means and rigidly mounted for rotation at the double gripper. A pivot device arranged at the support wall of the machine frame contains a control roll insertable into or engageable with the guide groove means of the control cam for rotating the associated double gripper, so that each oppositely situated end of a cable section grasped by such associated double gripper is moved into a rest position during one work cycle in the aforementioned parallel plane.

Still further, a centering module is fixedly arranged at the machine frame, and centering means are provided for each of the double grippers for defining an exact work position of the double gripper. The centering module possesses pivot arms engaging with the centering means for fixing the position of the associated double gripper.

According to a further feature, the centering means of each double gripper comprises a respective centering groove for centering and slidably guiding the double gripper, and the pivot arms of the centering module comprise centering runners which engage in the respective centering grooves for centering and slidably guiding the double gripper.

Also there are provided means for displaceably mounting each double gripper at the endless transport element for movement in a direction which is substantially perpendicular with respect to the movement plane of the endless transport element and substantially perpendicular to the lengthwise axis of the oppositely situated grasped ends of the grasped cable section, and spring means retain each double gripper in a rest position.

Regarding a still further feature of the present invention, there is provided a cable feed device for the infeed of a cable in the direction of the endless transport element, and a gripper actuator is stationarily arranged at a side wall of the machine frame at least at the region of the cable feed device. This gripper actuator comprises pivot arms which can be moved towards one another and equipped with actuation rolls for opening each double gripper against the force of the spring means closing such double gripper. Each double gripper has a gripper arm including an upper end provided with a guide or camming portion for receiving the actuation rolls of the gripper actuator.

Moreover, a pinion is fixedly mounted for rotation at each double gripper, and at least one rotating device is fixedly arranged at a support wall of the machine frame for rotating the double grippers. Such at least one rotating device comprises a displaceably mounted tooth rack engageable with the rotatably mounted pinion of each of the double grippers.

According to another inventive aspect, each double gripper comprises a support body member, and plate spring means provided for each double gripper bias the double gripper towards the support body member. Each support body member is provided with an array of circularly arranged recesses or depressions, and an arresting or latching element having a domed portion selectively engages with one of the circularly arranged recesses or depressions for securing the double gripper in a predetermined position into which the double gripper is biased by the action of the plate spring means.

Certain of the more notable advantages realized with the present invention essentially reside in the fact that with relatively modest space requirements there can be transported very short and within a certain range optionally long cable sections forming cable loops due to the arrangement of rotatable double or twin grippers upon a single transport element or device which is cyclically or intermittently moved along the processing line and due to the provision of stationary lateral guides beneath the transport element or device. Furthermore, by virtue of the rotatability of the double or twin grippers through an angle of about 180°, each grasped cable end or cable section end can be processed or fitted, as the case may be, with a plug-type terminal or electrical connector at each work station or fitting device or press. Additionally, due to the controlled rotation of each double gripper the grasped and finished-fitted cable ends or cable section ends can be moved past those fitting devices or presses which are not being used at the moment at the region of such fitting devices or presses without there being required moving such fitting devices or presses out of the way.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Describing now the drawings, it is to be understood that only enough of the construction of the cable section or cable transporting apparatus has been depicted therein, in order to simplify the illustration, as needed for those skilled in the art to readily understand the underlying principles and concepts of the present invention.

Figure 1:
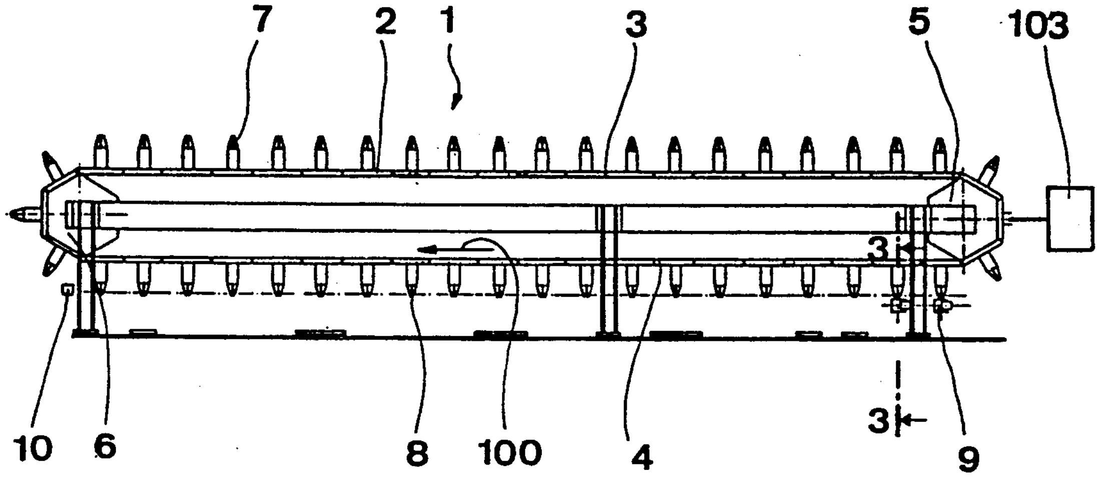
FIG. 1 illustrates in elevational view a cable processing line containing an endless transport or traction element equipped with double grippers arranged at a uniform spacing from one another at the outer periphery of such endless transport or traction element and serving for the transport of cable sections.

Turning attention now to FIG. 1, there is depicted therein a cable section or cable transporting apparatus which has been designated by reference numeral 1. This cable section transport apparatus 1 comprises an endless transport or traction element or device 2 embodying an upper run 3, a lower run 4, a first deflection or turning location 5 constituting a drive location for an intermittent operation of the cable section transport apparatus and a second deflection or turning location 6. At the outer periphery of the endless transport element 2 there are arranged at a substantially uniform or equidistant spacing from one another a plurality of double or twin grippers 7 comprising spaced apart grippers or gripper units 35 for receiving and graspingly retaining cable sections 8, specifically oppositely situated ends of each associated cable section.

Figure 2:
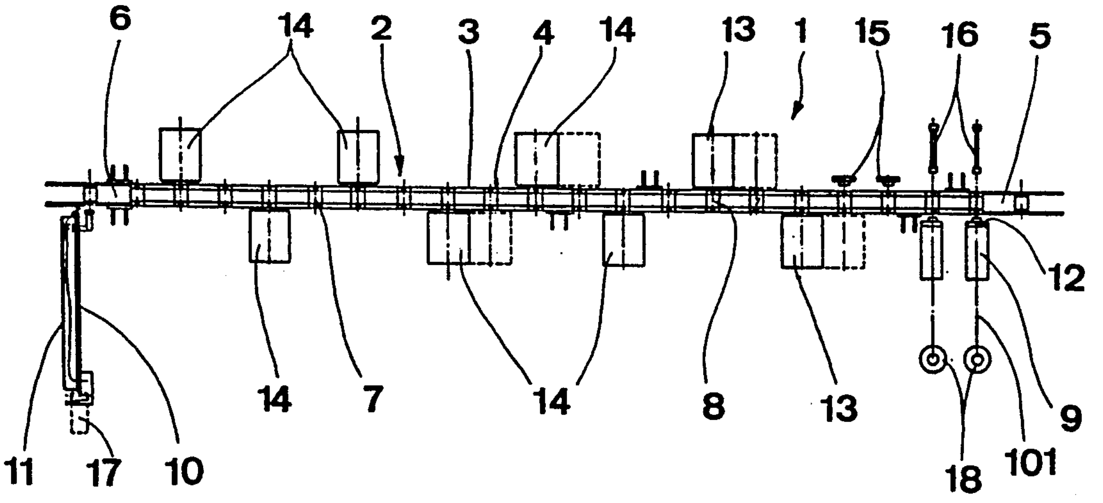
FIG. 2 is a top plan view of the cable processing line depicted in FIG. 1.

At the region of the first deflection location 5 there is provided at the lower run 4 of the endless transport element 2 a cable feed or infeed device 9 for the infeed or supply of the cable sections 8 in a direction substantially perpendicular to the direction of revolving movement 100 of the endless transport or traction element 2. At the vicinity of the second deflection location 6 there is provided, likewise at the region of the lower run 4, a cable out-transport or delivery device 10 and a cable deposit means or receiver device 11 for the deposition of the cable sections which have been processed by the cable section transport apparatus 1. FIG. 2 additionally depicts different cable work stations throughout the entire region of the lower run 4 of the endless transport element 2, such as cutting stations 12 at the left-hand side of the cable section transport apparatus 1 looking in the direction of movement 100 thereof from the first deflection location 5 towards the second deflection location 6, insulation stripping stations 13, processing stations 14, right-hand located cutting stations 15, insertable guide tubes or pipes 16 for the cable feed or infeed device 9, a tying device 17 and a cable magazine or storage 18.

FIG. 3 again depicts the lower run 4 of the endless transport element 2. It will be recognized that such lower run 4 of this endless transport element 2 is guided between two substantially vertical support or carrier walls 19 and 20 such that there is precluded lateral deviation of this lower run 4 and there is accommodated the through-hang or slack of such lower run 4 of the endless transport element 2. The double or twin grippers 7 dispositioned at the outer periphery of the endless transport element 2 serve to graspingly engage with and carry the cable sections 8 which are infed by the cable feed device 9 of the cable section transport apparatus 1. This cable feed device 9 comprises a stationary feed or advance unit or device 21 for the cable, generally indicated by reference numeral 101 in FIG. 2, and which is installed upon a machine frame 22, an exchangeably arranged rapid exchange or replaceable unit 23 and a cable magazine 18 from which there is removed the cable 101 (see also FIG. 1). In the exemplary embodiment under discussion, and as particularly evident by inspecting FIGS. 1 and 2, there is provided a double cable feed device 9.

Figure 3:
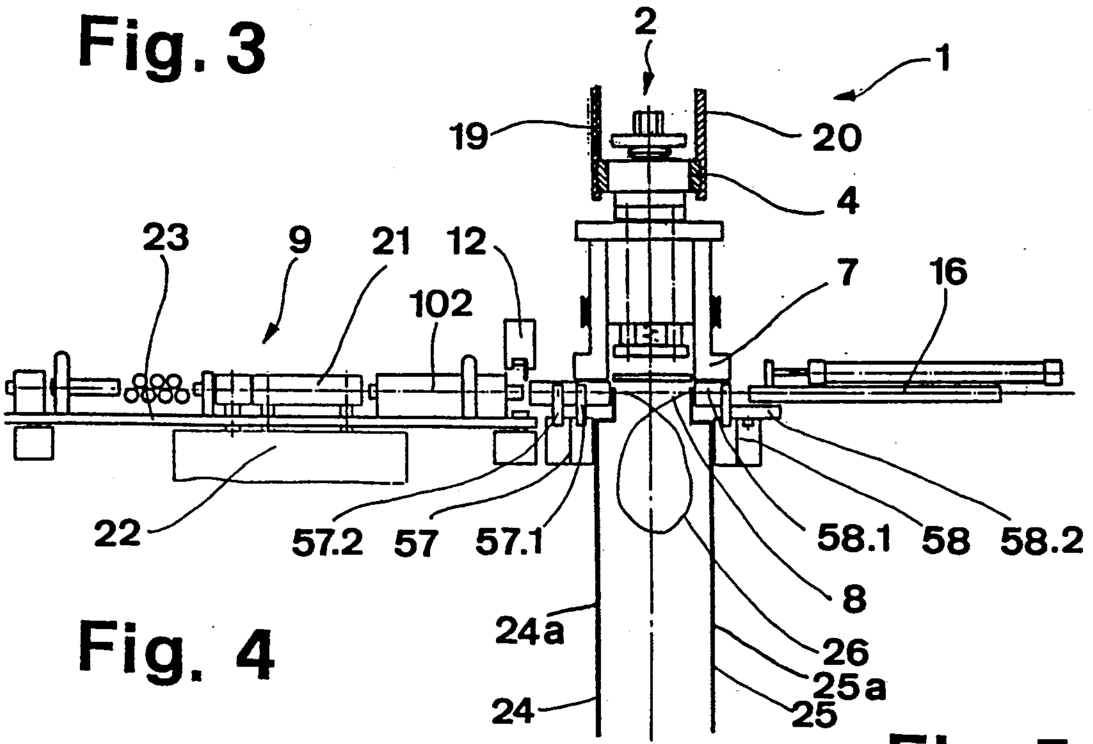
FIG. 3 is a cross-sectional view of the cable processing line depicted in FIG. 1, taken substantially along the section line 3—3 thereof.

Continuing, and directing attention to FIGS. 2 and 3, it will be seen that two fixed mutually parallel, juxtaposed guides or guide members 24 and 25, for instance, formed of sheet metal or plating, are arranged beneath the lengthwise axis 102 of the cable feed device 9. These guides or guide members 24 and 25 extend substantially parallel to the cable section transport apparatus 1. Between these spaced apart guides or guide members 24 and 25 there are guided any possibly hanging loops 26 of the grasped cable sections 8. Stationary double or twin gripper units 57, arranged at the left-hand side of the showing of FIG. 3, and stationary double or twin grippers units 58, arranged at the right-hand side of the showing of FIG. 3, are each positioned along the lengthwise axis 102 of the cable feed device 9 externally of the neighboring outer side or side wall 24*a* and 25*a* of the associated guide members 24 and 25, respectively. The double gripper units 57 and 58 respectively possesses the inbound or inwardly situated grippers 57.1 and 58.1 and the outbound or outwardly situated grippers 57.2 and 58.2.

Figure 4:
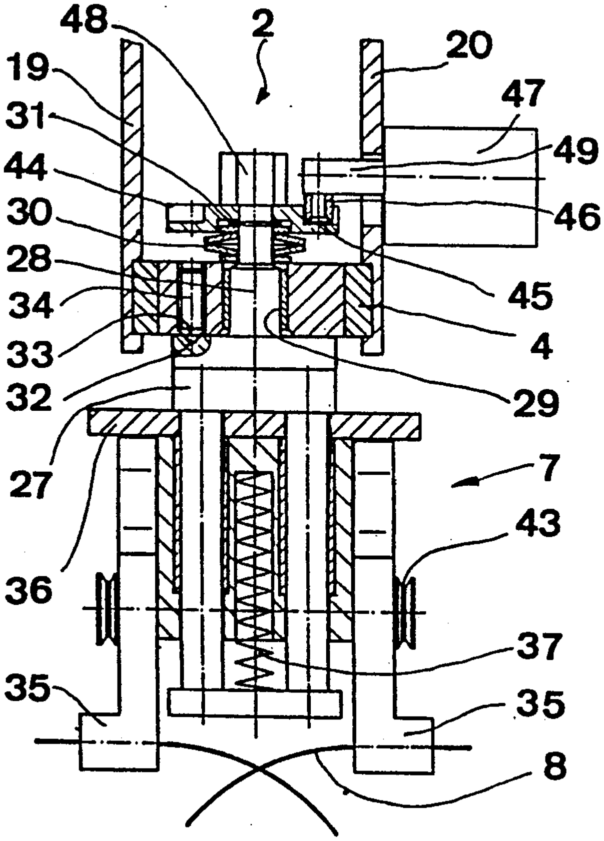
FIG. 4 is a cross-sectional view through the endless transport or traction element and through a double gripper of the arrangement of FIG. 1.
Figure 5:
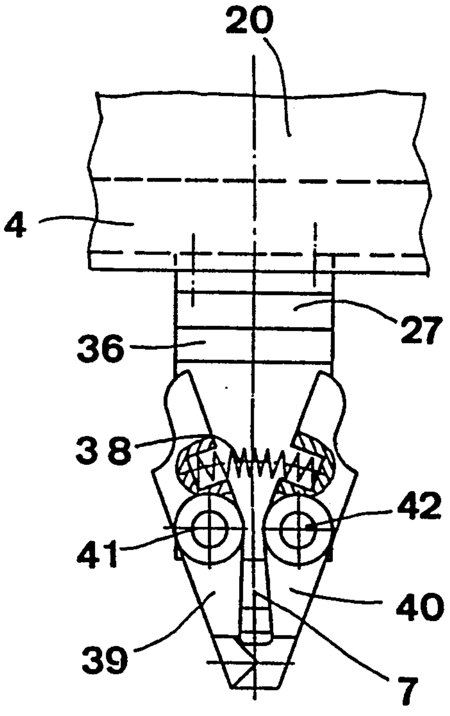
FIG. 5 is a fragmentary elevational view of the double gripper depicted in its closed position.

FIGS. 4 and 5 illustrate on an enlarged scale one of the double or twin grippers 7 supported by the endless transport element 2 of the cable section transport apparatus 1. Each such double gripper 7 is mounted for rotation at the endless transport element 2, and to that end, a support body member 27 of the double gripper 7 is rotatably journaled by means of journal or pivot pin 28 in a bore 29 disposed substantially perpendicular to the travel or movement direction 100 of the endless transport element 2 and is resiliently retained by plate springs 30 or the like and a clamping or retaining ring 31. Circularly arranged recesses or depressions 32 provided in the support body member 27 are located between such support body member 27 and the endless transport element 2 and with which engage the arched head or domed portion 33 of an arresting or latching element or screw 34 mounted in the endless transport element 2. Both of the grippers or gripper elements 35 of the double or twin gripper 7 are arranged for opening and closing movement at a slide body member 36 slidably mounted at the support body member 27.

As will be seen in FIGS. 4 and 5, a first compression or pressure spring 37 retains the slide body member 36 in a rest position at the support body member 27, whereas a respective second compression or pressure spring 38 biases both gripper arms 39 and 40 of each gripper or gripper unit 35 of the double gripper 7 into a closed or effectual position. Centering grooves or depressions 43 for centering the double gripper 7 are provided at pivot pins or journals 41 and 42 of the gripper arms 39 and 40, respectively. A control cam or disk 44 is arranged above the clamping ring 31. This control cam or disk 44 is rigidly connected for rotation with the journal or pivot pin 28 of the support body member 27 and retained in place by a securing nut member 48 or equivalent structure. A guide groove or cam track 45 is provided in the control cam 44 and a control roll or follower roll 46 arranged at an insertable or displaceable support arm member 49 of a pivot device 47 engages with this guide groove or track 45.

Figure 6:
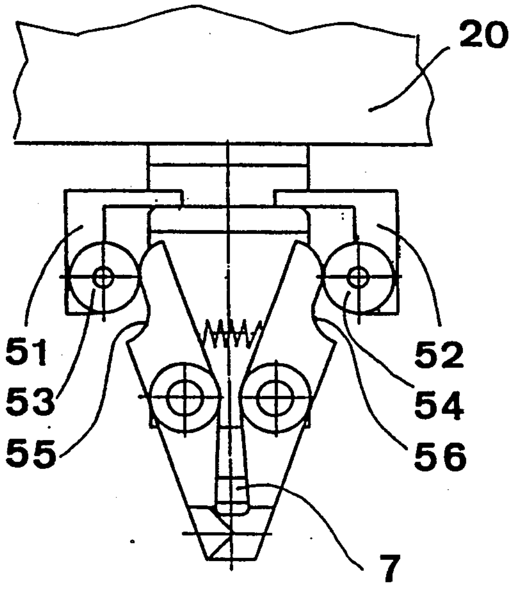
FIG. 6 is a fragmentary elevational view of the double gripper depicted in its closed position and further showing a gripper actuator in its open or ineffectual position.
Figure 7:
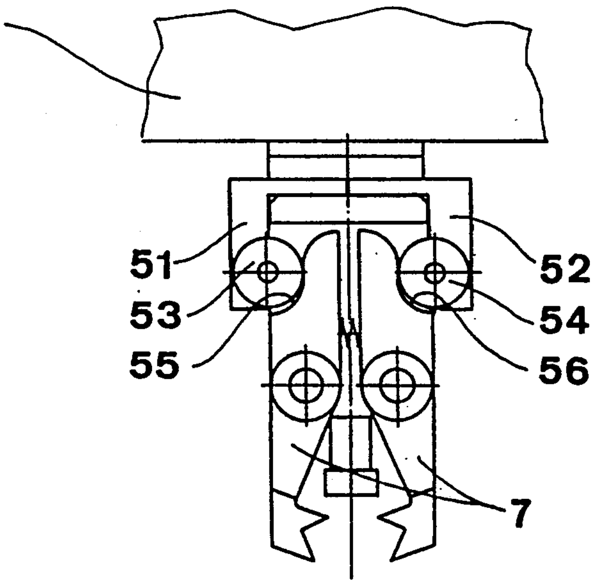
FIG. 7 is a fragmentary elevational view of the double gripper depicted in its open position and showing the gripper actuator in its closed or effectual position.
Figure 8:
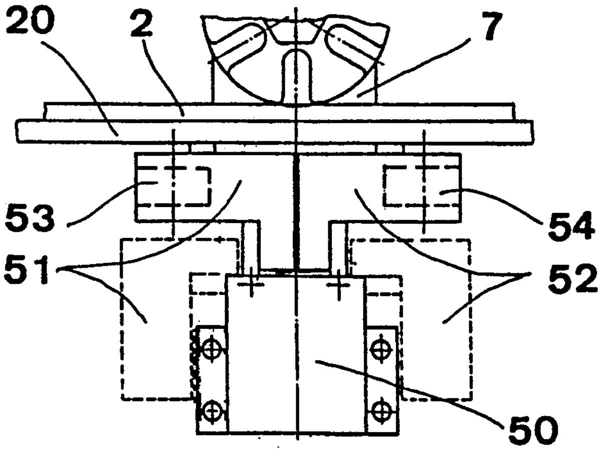
FIG. 8 is a fragmentary top plan view of the gripper actuator.

FIGS. 6, 7 and 8 illustrate one of the double grippers 7 in conjunction with a gripper actuation device or actuator 50. The gripper actuator 50 comprises two pivot arms or arm members 51 and 52, which can be shifted towards and away from one another, and each pivot arm 51 and 52 is equipped with a respective actuation roll or element 53 and 54. In order to open the double gripper 7 these actuation rolls 53 and 54 engage with a respective associated guide or camming portion or element 55 and 56 arranged at one end of the double gripper 7, that is, the upper end regions of the gripper arms 39 and 40. Such gripper actuators 50 are arranged at the region of the cable feed or infeed device 9 for initiating gripping of an infed cable section 8 and also at the region of the cable out-transport or delivery device 10 for initiating release or delivery of a cable section 8.

Figure 9:
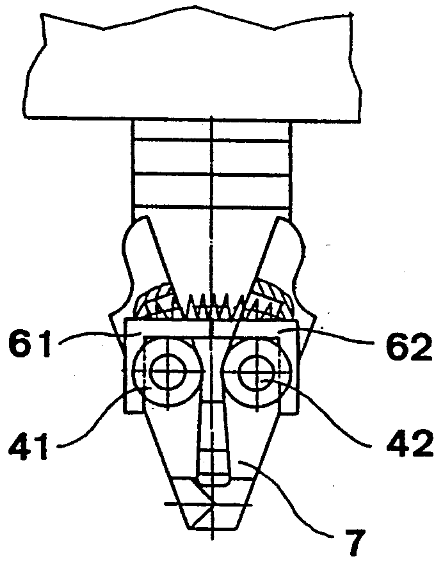
FIG. 9 is a fragmentary elevational view of the double gripper depicted in its closed position and an incorporated centering module.
Figure 10:
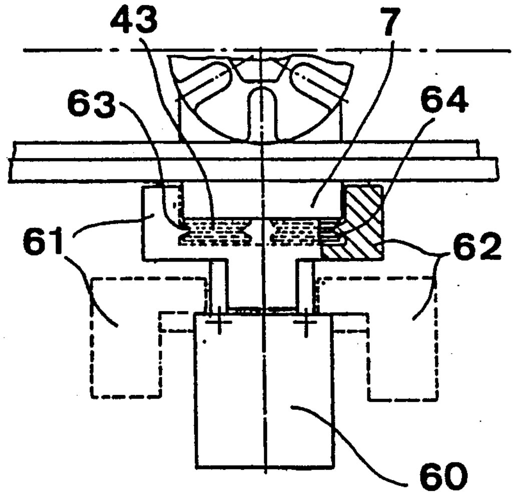
FIG. 10 is a top plan view of the centering module.

FIGS. 9 and 10 depict one of the double grippers 7 equipped with a centering module or unit 60. The centering module 60 is stationarily arranged in each case at the side opposite to a cable work station and comprises two, as viewed in section, substantially right-angle pivot arms or arm members 61 and 62 each having a centering runner or guide 63 and 64, respectively, engaging with a centering means or device, specifically the centering grooves 43 of the pivot pins or journals 41 and 42 of the gripper arms 39 and 40, respectively. The upper legs of the pivot arms 61 and 62 determine the upper limit of the elevational position of the double gripper 7, and the centering runners or guides 63 and 64 determine the exact lateral position and the distance to the cable work, station. Since the centering grooves 43 of the pivot pins or journals 41 and 42 are slidably guided upon the centering runners or guides 63 and 64 of the pivot arms 61 and 62, respectively, there is possible at all times a vertical displacement of the double gripper 7 for achieving its exact elevational position by means of an adjustable entrainment member of the cable work station.

Figure 11:
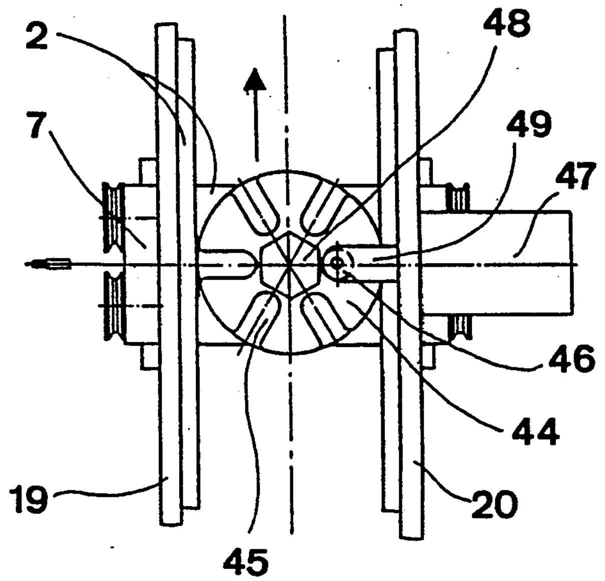
FIG. 11 is a top plan view of the double gripper in its normal position and an inserted pivoting device.
Figure 12:
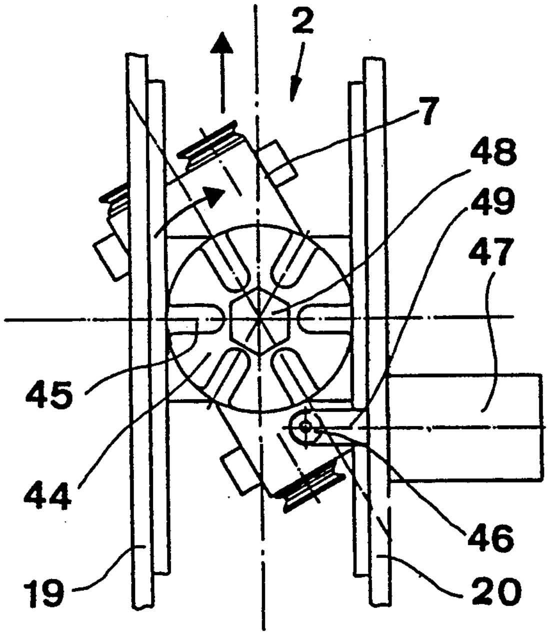
FIG. 12 is a top plan view of the double gripper in a pivoted- or turned-in position together with the inserted pivoting device.

FIGS. 11 and 12 depict in top plan view one of the double grippers 7 in conjunction with the insertable pivot device 47. The double gripper 7 is rotatably mounted at the endless transport element 7 and retained in its rest or ineffectual position by means of the plate springs 30 (FIG. 4) and the arresting or latching element or screw 34. As previously explained, the control cam 44 is rigidly connected for rotation with the double gripper 7 and secured in place by means of the securing nut member 48. The pivot device 47 is stationarily arranged at an associated one of the support walls 19 and 20 of the endless transport element 2 at the region of a cable work station. The control roll 46 rotatably arranged at the displaceable support arm member 49 can be inserted into the guide groove 45 of the control cam 44. Due to the cyclical or intermittent movement of the endless transport element 2 the double gripper 7 automatically rotates through an angle of approximately 60° as a result of the control roll or cam follower 46 engaging with the guide groove or cam track 45 of the control cam 44 until departure of such control roll 46 out of the guide groove or cam track 45. As a result, the arresting or latching element 34 again latches into an appropriately arranged recess or depression 32 of the endless transport element 2.

Figure 13:
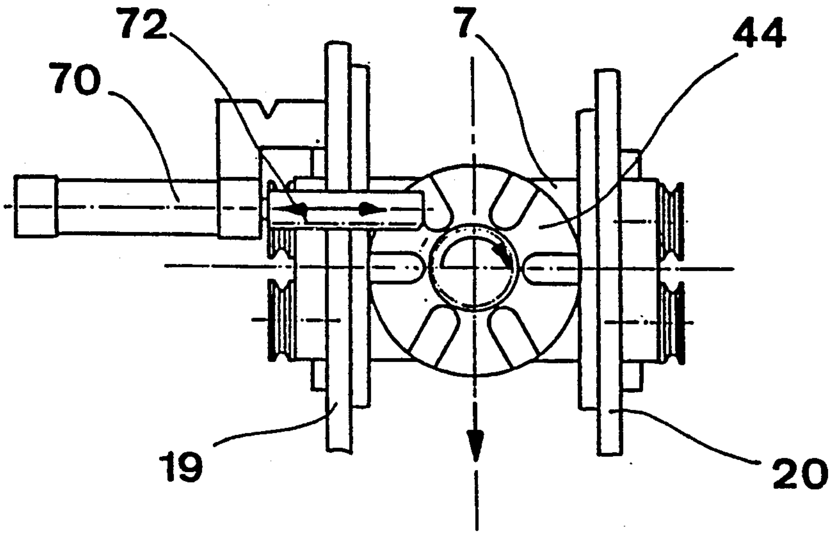
FIG. 13 is a top plan view of a rotating device, here shown at the left side, for rotating the double gripper through an angle of 180° in clockwise direction.
Figure 14:
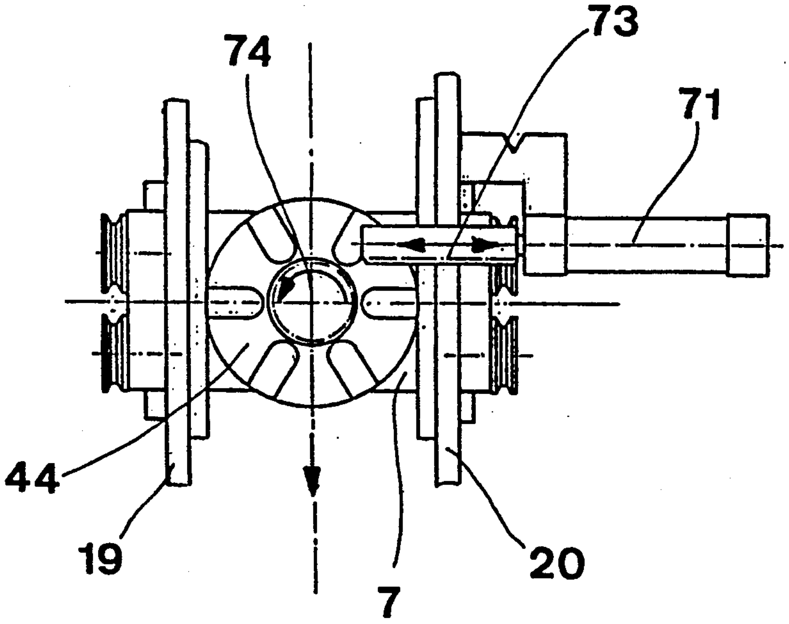
FIG. 14 is a top plan view of a rotating device, here shown at the right side, for rotating the double gripper through an angle of 180° in counterclockwise direction.

FIGS. 13 and 14 depict in top plan view one of the double grippers 7 provided with a respective rotating or turning device 70 and 71. Each such rotating or turning device 70 and 71 is stationarily arranged at the associated support wall 19 and 20, respectively, of the endless transport element 2 at the region of a cable work station. Furthermore, each such rotating or turning device 70 and 71 comprises a slidably mounted and, for example, pneumatically actuated tooth rack 72 and 73, respectively, which cooperates with a related pinion 74 arranged at the control cam 44 and rigidly connected for rotation with the double gripper 7. By means of each such rotating or turning device 70 and 71 it is possible to rotate through an angle of about 180° the double gripper 7 in one or the other rotational directions, that is, clockwise (FIG. 13) or counterclockwise (FIG. 14), and specifically, there can be thus correspondingly rotated at the relevant work station a cable section 8 which is grasped at both cable ends by the double gripper 7.

Having had the benefit of the foregoing detailed description of the exemplary embodiment of cable or cable section transporting apparatus of the present invention, there will be now considered its mode of operation, which is as follows:

The endless transport element 2 equipped with the double grippers 7 arranged at its outer periphery is cyclically or intermittently driven by any suitable drive device or drive motor, generally indicated by reference numeral 103 in FIG. 1. During the revolving or circulatory movement of the endless transport element 2 the double grippers 7 located at the lower run 4 thereof are moved past different work or processing stations for the cable sections 8. The cable is brought with the aid of the feed or advance unit 21 of the cable feed device 9 and the rapid exchange or replacement unit 23, perpendicular to the travel or transport direction 100 of the endless transport element 2, to the region of the double grippers 7. As more fully explained in the aforementioned commonly assigned, copending U.S. application Ser. No. 07/780,296, filed Oct. 22, 1991, now abandoned, and entitled "Cable Feed Apparatus", to which reference may be readily had and the disclosure of which is incorporated in its entirety herein by reference, the cable feed device 21 comprises a coacting spatially stationary revolving belt drive and a displaceable revolving belt drive between which there is transported the clamped cable 101 to be cut into cable sections or lengths 8, and a length measuring device driven by the transported cable for measuring the cable length. The infed cable 101 is cut by the left-hand cutting station 12 appearing in FIG. 2 and the end of the cable is guided through the feed device 21 and, with the aid of the inserted guide tube 16, during a first operating phase, through an always equally monitored minimum length to the takeover region of the endless transport element 2. The end of the cable is grasped by the inbound or inner gripper 58.1 of the stationary right-hand double gripper 58 while the guide tube 16 moves away from the region of the endless transport element 2, and the outbound or outer gripper 58.2 of the stationary right-hand gripper 58 likewise grasps or engages the cable end.

Now, during a second operating phase, the feed device 21 transports a preselected residual cable length, likewise monitored by the aforementioned cable length measuring device, and the left-hand stationary double gripper 57 serves as a guiding aid and there is formed a cable loop 26 between the guide members 24 and 25. After there has been attained the preselected length of the cable 10 then the stationary left-hand double gripper 57 engage the cable 101 and the left-hand cutting station 12 severs such cable. The thus formed cable section or length 8 is taken over by an associated one of the double grippers 7 of the endless transport element 2 in that both of the inner grippers 57.1 and 58.1 of the stationary double grippers 57 and 58 open, one of the double grippers 7 of the endless transport element 2 momentarily located along the lengthwise axis of the cable feed device 9 likewise opens due to the insertion of the gripper actuators 50 at both sides of the endless transport element 2 and is pressed in the open gripper state over the cable section 8. Both ends of the cable section 8 are still seized by both of the outer grippers 57.2 and 58.2 of the stationary double grippers 57 and 58, respectively, and the double gripper 7 closes, on the one hand, as a result of opening of the gripper actuators 50 and, on the other hand, through the force of the compression springs 38, and there are now engaged the ends or end portions of the cable section 8.

Now both of the outbound or outer grippers 57.2 and 58.2 of the stationary double grippers 57 and 58, respectively, likewise open and the displacement module releases the double gripper 7 of the endless transport element 2. As a result, the double gripper 7 is again pressed or biased into its rest position due to the force of the compression spring 37 in which the cyclical or intermittent transfer movement of the double gripper 7 together with the grasped or engaged cable section 8 is accomplished by means of the endless transport element 2. After each cyclical or intermittent movement of the endless transport element 2 there is accomplished a working operation during which both ends of the cable section 8 can be processed or provided with a terminal or electrical connector.

To ensure the exact position of the ends of the cable section 8 to accomplish such processing operation or work, the corresponding double gripper 7, forwardly of each work station, is aligned by means of the centering module or device 60 arranged opposite to the work station. The pivot or pivotable arms 61 and 62 of the centering module 60 pivot in the direction of the double gripper 7, and the upper legs of the pivot arms 61 and 62, which are angle-shaped in cross-section, determine the elevational position. Furthermore, the centering runners 63 and 64 engaging with the centering grooves 43 of the pivot journals 41 and 42 of the gripper arms 39 and 40, respectively, of the double gripper 7 determine the exact lateral position and the exact distance or spacing to the cable work station. Before 10 there occurs working or processing of the cable section 8, an adjustable entrainment member of the cable work station presses the double gripper 7, and specifically, the ends of the engaged cable section 8 into the exact elevational position, and the double gripper 7 does not alter its centered horizontal position due to the centering groove 43 of the pivot journals 41 and 42 which are slidably guided upon the centering runners 63 and 64, respectively. Thus, for the subsequent processing of the cable end, there is ensured the exact position of the ends of the cable section 8 grasped by the related double gripper 7.

Cable ends of cable sections 8 which have already been processed, and which move past a cable work station which is no longer needed, would collide with such cable work station, resulting in undesirable damage to the cable ends or the thereat fitted terminals or electrical connectors. In order to avoid the occurrence of such undesirable operation, at the region of the last required or used cable work or processing station the double gripper 7 is inwardly rotated or turned-in through, for instance, an angle of 60° and is again outwardly pivoted back into its normal gripper transport position at the region of the last cable work station before the cable out-transport or delivery device 10. For this purpose, at the last required cable work station, and specifically by means of the stationary pivot or pivoting device 47 the control roll or cam follower 46 arranged at the support arm 49 is introduced into the guide groove 45 of the control cam or disk 44 of a there present double gripper 7. As a result of the cyclical or intermittent forward or advance movement of the endless transport element 2 the double gripper 7 together with the grasped cable section 8 is rotated into an inclined position where the ends of the cable section 8 are sufficiently spaced from the cable work stations and the arresting or latching element 34 arranged at the endless transport element 2 is latched, under the exerted force of the plate springs 30, into a corresponding recess or depression 32 of the support body member 27 of the double gripper 7. The return rocking or pivoting of the double gripper 7 back into its normal transport position is accomplished by a similar stationary pivot or pivoting device arranged at the last cable work station forwardly or upstream of the cable out-transport device 10 at the opposite side of the endless transport element 2. As a result, in the same manner as previously described, the control roll 46 of such pivot device is inserted from the opposite side into the guide groove 45 of the control cam or disk 44.

In order to be able to fully exploit the cable or cable section work or processing stations arranged to both sides of the cable processing line, there are additionally provided the respective rotating or turning devices 70 and 71 considered previously with reference to FIGS. 13 and 14. So that both ends of the cable section 8 grasped by a related double gripper 7 can be processed by any desired or random cable work station, the double gripper 7 within a cable work station can be advantageously rotated through an angle of about 180° by a related one of the rotating or turning devices 70 and 71 stationarily mounted at an associated one of the support walls 19 and 20, respectively. To that end, the slidably or displaceably arranged tooth racks 72 and 73 are, for instance, pneumatically actuated and mesh with the pinion 74 connected for rotation with the associated double gripper 7 and thus rotates such double gripper 7 through an angle of approximately 180°. Consequently, by virtue of the exerted force of the plate springs 30 the arresting or latching element or screw 34 likewise latches into a corresponding recess or depression 32 of the support body member 27 of the double gripper 7 and both ends of the cable section 8 are now directed towards the cable work stations or locations arranged at the other side of the endless transport element 2. To accomplish this processing and fitting of the cable ends of the cable section 8 there are required or possible the same manipulations as described above by means of the centering module 60, the pivot device 47 or rotating devices 70 and 71. At the end of the cable processing line the cable section 8 is taken over by the cable out-transport or delivery device 10 or by a further fitting installation or station, and the double gripper 7, just as was the case at the cable feed or infeed device 9, is opened due to the pivoting-in and moving together of the pivot arms 51 and 52 of the stationary gripper actuator 50, and thus, the cable section 8 is released.

While there are shown and described present preferred embodiments of the invention, it is distinctly to be understood the invention is not limited thereto, but may be otherwise variously embodied and practiced within the scope of the following claims.

What is claimed is:

1. The apparatus for transporting cable sections in a direction substantially perpendicular to the lengthwise axis of each of the cable sections, comprising:

a machine frame;

at least one intermittently driven revolving endless transport element defining a single endless transport element having deflection locations and an outer periphery arranged upon the machine frame;

a plurality of work stations for processing the cable sections arranged along the single endless transport element;

double grippers arranged behind one another at substantially the same spacing from one another at the region of the outer periphery of the transport element;

means for rotatably mounting each of the double grippers to the single endless transport element;

each of the double grippers being movable from an open position into a closed position;

spring means for closing the double grippers so as to assume the closed position in order to grasp both oppositely situated ends of an associated cable section at the region of one deflection location of the transport element;

a cable feed device for delivering the cable sections to the double grippers of the single endless transport element;

a cable processing device arranged at the region of another one of the deflection locations;

the double grippers retaining the cable sections, moving the retained cable sections past the work stations, and at the region of the other deflection location of the transport element the double grippers transfer the previously grasped cable sections to the cable processing device during the intermittent revolving motion of the single endless transport element; and spring means for selectively retaining each associated double gripper in a first work position or a second work position rotated through an angle of approximately 180° with respect to the first position where each cable end of a grasped cable section is retained in a plane which extends substantially parallel to a movement plane of the single endless transport element in a direction towards the cable work stations.

2. The apparatus for transporting cable sections according to claim 1, wherein:

the cable processing device comprises a receiver for the reception of the cable sections.

3. The apparatus for transporting cable sections according to claim 1, wherein:

the cable processing device comprises a cable fitting station.

4. The apparatus for transporting cable sections according to claim 1, wherein:

each of the double grippers comprises a pair of spaced apart gripper units; and each gripper unit of a double gripper engaging one end of oppositely situated ends of a grasped cable section.

5. The apparatus for transporting cable sections according to claim 1, further including:

a support wall provided for the machine frame;

means for enabling pivoting each of the double grippers;

said pivoting enabling means comprising for each double gripper a control cam possessing guide groove means and rigidly mounted for rotation to the double gripper;

a pivot device arranged at the support wall of the machine frame; and said pivot device containing a control roll insertable into the guide groove means of the control cam for rotating the associated double gripper, so that each oppositely situated end of a cable section grasped by such associated double gripper is moved into a rest position during one work cycle in said plane which extends substantially parallel to the movement plane of the single endless transport element.

6. The apparatus for transporting cable sections according to claim 5, further including:

means for displaceably mounting each double gripper to the single endless transport element for movement in a direction substantially perpendicular with respect to the movement plane of the single endless transport element and substantially perpendicular to the lengthwise axis of the oppositely situated grasped ends of the grasped cable sections; and spring means for retaining each double gripper in a rest position.

7. The apparatus for transporting cable sections according to claim 5, wherein:

the machine frame comprises a side wall;

a gripper actuator stationarily arranged at the side wall of the machine frame at least at the region of the cable infeed device;

said gripper actuator comprising pivot arms movable towards one another and equipped with actuation rolls for opening each double gripper against the force of the spring means closing such double gripper;

each double gripper having a gripper arm including an upper end; and a guide portion provided at the region of the upper end of each gripper arm of each double gripper with which operatively coact the actuation rolls of the gripper actuator.

8. The apparatus for transporting cable sections according to claim 5, further including:

a pinion fixedly mounted for rotation to each double gripper;

at least one rotating device fixedly arranged at the support wall of the machine frame for rotating the double grippers; and said at least one rotating device comprising a displaceably mounted tooth rack engageable with the rotatably mounted pinion of each of the double grippers.

9. The apparatus for transporting cable sections in a direction substantially perpendicular to the lengthwise axis of each of the cable sections, comprising:

a machine frame;

at least one intermittently driven revolving endless transport element defining a single endless transport element having deflection locations and an outer periphery arranged upon the machine frame;

a plurality of work stations for processing the cable sections arranged along the single endless transport element;

double grippers arranged behind one another at substantially the same spacing from one another at the region of the outer periphery of the transport element;

means for rotatably mounting each of the double grippers to the single endless transport element;

each of the double grippers being movable from an open position into a closed position;

spring means for closing the double grippers so as to assume the closed position in order to grasp both oppositely situated ends of an associated cable section at the region of one deflection location of the transport element;

a cable feed device for delivering the cable sections to the double grippers of the single endless transport element;

a cable processing device arranged at the region of another one of the deflection locations;

the double grippers retaining the cable sections, moving the retained cable sections past the work stations, and at the region of the other deflection location of the transport element the double grippers transfer the previously grasped cable sections to the cable processing device during the intermittent revolving motion of the single endless transport element;

a centering module fixedly arranged at the machine frame;

centering means provided for each of the double grippers for defining an exact work position of the double gripper; and the centering module possessing pivot arms engaging with the centering means for fixing the position of the associated double gripper.

10. The apparatus for transporting cable sections according to claim 9, wherein:

the centering means provided for each double gripper comprises a respective centering groove for centering and slidably guiding the double gripper; and the pivot arms of the centering module comprise centering runners which engage in the respective centering grooves for centering and slidably guiding the double gripper.

11. The apparatus for transporting cable sections in a direction substantially perpendicular to the lengthwise axis of each of the cable sections, comprising:

a machine frame;

at least one intermittently driven revolving endless transport element defining a single endless transport element having deflection locations and an outer periphery arranged upon the machine frame;

a plurality of work stations for processing the cable sections arranged along the single endless transport element;

double grippers arranged behind one another at substantially the same spacing from one another at the region of the outer periphery of the transport element;

means for rotatably mounting each of the double grippers to the single endless transport element;

each of the double grippers being movable from an open position into a closed position;

spring means for closing the double grippers so as to assume the closed position in order to grasp both oppositely situated ends of an associated cable section at the region of one deflection location of the transport element;

a cable feed device for delivering the cable sections to the double grippers of the single endless transport element;

a cable processing device arranged at the region of another one of the deflection locations;

the double grippers retaining the cable sections, moving the retained cable sections past the work stations, and at the region of the other deflection location of the transport element the double grippers transfer the previously grasped cable sections to the cable processing device during the intermittent revolving motion of the single endless transport element, wherein each double gripper comprises a support body member;

plate spring means provided for each double gripper for biasing the double gripper towards the support body member;

each support body member being provided with an array of circularly arranged recesses; and an arresting element having a domed portion engaging with one of the circularly arranged recesses for securing the double gripper in a predetermined position into which the double gripper is biased by the action of the plate spring means.

* * * * *